United States Patent [19]

Shibuya et al.

[11] Patent Number: 5,173,241
[45] Date of Patent: Dec. 22, 1992

[54] METHOD AND APPARATUS FOR INJECTION MOLDING HOLLOW SHAPED ARTICLE

[75] Inventors: Takehiro Shibuya; Yasuyoshi Ishihara, both of Yokohama; Susumu Imai, Zama, all of Japan

[73] Assignee: Asahi Kasei Kogoyo Kabushiki Kaisha, Osaka, Japan

[21] Appl. No.: 490,597

[22] PCT Filed: Dec. 21, 1989

[86] PCT No.: PCT/JP89/01282
  § 371 Date: May 24, 1990
  § 102(e) Date: May 24, 1990

[87] PCT Pub. No.: WO90/07415
  PCT Pub. Date: Jul. 12, 1990

[30] Foreign Application Priority Data

Dec. 26, 1988 [JP] Japan ............... 63-325923
Feb. 20, 1989 [JP] Japan ............... 1-38245

[51] Int. Cl.⁵ .................... B29C 45/00; B29D 22/00
[52] U.S. Cl. ........................ 264/572; 264/37; 264/328.8; 264/328.12; 264/382.13; 425/149; 425/215; 425/557; 425/559; 425/560
[58] Field of Search ............... 264/37, 328.8, 328.12, 264/328.13, 500, 572; 425/149, 215, 216, 217, 546, 557, 559, 560, 812

[56] References Cited

U.S. PATENT DOCUMENTS

4,247,515  1/1981  Olabisi ................. 264/500
4,394,333  7/1983  Fukushima et al. ..... 264/37
4,824,732  4/1989  Hendry et al. ........ 264/37 X
5,047,183  9/1991  Eckardt et al. ........ 264/572 X

FOREIGN PATENT DOCUMENTS

39929      11/1981  European Pat. Off.
53-9870     1/1978  Japan.
56-157323  12/1981  Japan.
57-14968    3/1982  Japan.
61-59899   12/1986  Japan.

Primary Examiner—Leo B. Tentoni

[57] ABSTRACT

In the injection molding of a hollow shaped article by the injection of not only molten synthetic resin but also compressed gas into a die, a method is provided by this invention which effects the supply of the compressed gas with a multistage compressor and the injected compressed gas is recovered in a recovery container connected to the suction side of the multistage compressor. For the injection molding of a hollow shaped article by the injection of not only molten synthetic resin but also compressed gas into a die, an apparatus is provided by this invention which has a gas nozzle for injecting the compressed gas into the die connected through a first switching valve to the discharge side of the multistage compressor and, at the same time, has the gas nozzle connected through a second switching valve to a recovery container connected to the suction side of the multistage compressor.

13 Claims, 7 Drawing Sheets

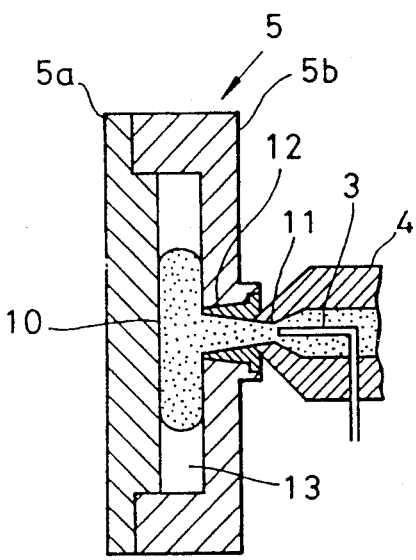
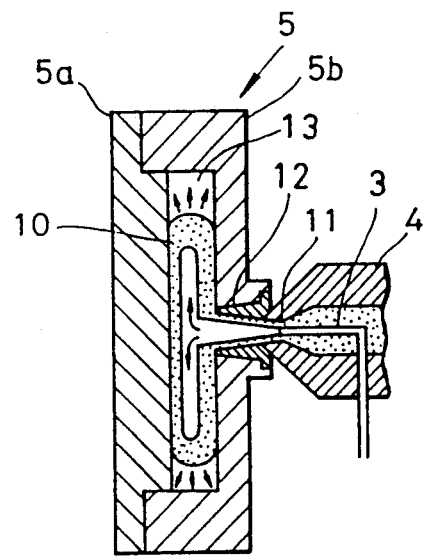
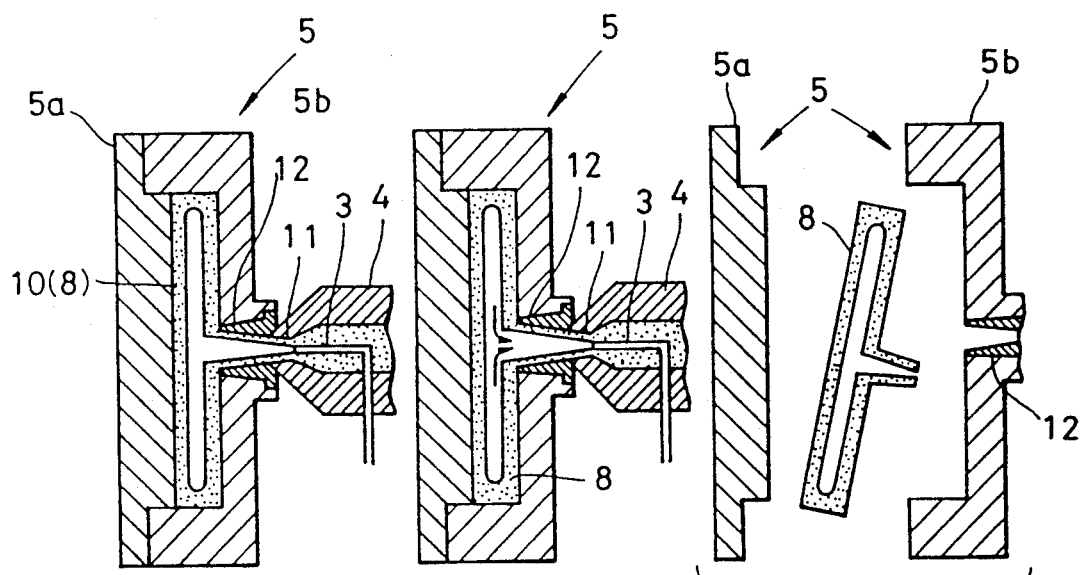
Fig. 2(a)　　Fig. 2(b)　　Fig. 2(c)　Fig. 2(d)　　Fig. 2(e)

METHOD AND APPARATUS FOR INJECTION MOLDING HOLLOW SHAPED ARTICLE

FIELD OF THE INVENTION

This invention relates to a method for injection molding a hollow shaped article by injecting not only molten synthetic resin but also compressed gas into a die and an apparatus therefor, specifically to supply and recovery of the compressed gas.

BACKGROUND OF THE INVENTION

As a technique for injection molding a hollow shaped article, Japanese Patent Publication No. 14968/1982 discloses a method which comprises injecting into the cavity of a die molten synthetic resin of an amount insufficient for filling the cavity, subsequently injecting compressed gas through the same inlet into the die either independently of or in combination with molten synthetic resin until the cavity is filled to capacity. This Japanese patent publication further discloses, as typical contrivance for executing this method, an apparatus which comprises a cylinder and a piston connected integrally via a switching valve to a gas source, a pressure increasing device for aspiring the gas from the gas source while the piston is in the process of retracting and increasing the pressure of this aspirated gas and feeding out the compressed gas while the piston is in the process of advancing, an injection nozzle enclosing therein a gas nozzle connected through a check valve to the pressure increasing device, and a die adapted to permit forced contact therewith of the injection nozzle and admit the molten synthetic resin and the compressed gas both emanating from the injection nozzle.

In accordance with the method and apparatus described above, the hollow shaped article is made to take shape with the compressed gas filling up the cavity of the shaped article. In Japanese Patent Publciation No. 14968/1982, however, no particular mentioned is made as to how the compressed gas filling up the cavity of the hollow shaped article is released from the interior of the die (namely from the cavity of the hollow shaped article) prior to the removal of the hollow shaped article from the die. If the discharge of the compressed gas from within the hollow shaped article prior to the removal of the hollow shaped article should be effected by separating the injection nozzle from the die, the compressed gas entrapped in the hollow shaped article would burst out instantaneously at the moment the injection nozzle breaks away from the die. This abrupt burst of the compressed gas leads to objectionable noise and, at the same time, impairs the repeatability of shape of hollow shaped articles to be successively molded. Further since the compressed gas thus liberated necessarily finds its way into the ambient air, it is not reclaimed but wasted. The gas, depending on its particular kind, could jeopardize the workshop atmosphere.

For the purpose of alleviating the drawback mentioned above, Japanese Patent Publication No. 59,899/1986 proposes a method which resides in controlling the discharge speed of the compressed gas emanating from within the cavity of the hollow shaped article and allowing the compressed gas to be recovered in a pressure container. Specifically, this invention, by the use of an apparatus similar to the apparatus disclosed in Japanese Patent Publication No. 14,968/1982, excepting the conduit interconnecting the injection nozzle and the pressure increasing device is branched and a pressure container is connected to the branch, contemplates first recovering the compressed gas from the cavity of the hollow shaped article into the pressure container and then aspirating for re-use of the recovered compressed gas from within the pressure container while the piston of the pressure increasing device is in the process of retracting.

In case of the method and apparatus mentioned above, however, when the pressure container used in the recovery of the compressed gas from within the hollow shaped article into the pressure container is small, the compressed gas cannot be recovered in an amply large amount because the pressure inside the hollow shaped article and inside the pressure container reaches the state of equilibrium after the compressed gas has been recovered only in a very small amount. The method, therefore, requires use of the pressure container of a large capacity and entails the problem of coping with the cost of equipment and the problem of securing ample floor space for the installation of the equipment. Even when the pressure container to be used has a large capacity, the compressed gas cannot be completely prevented from remaining in the cavity of the hollow shaped article under the same pressure as in the reaction container and from being released into the ambient air when the die is opened.

Particularly since the conventional method and apparatus effects the supply of the compressed gas with a pressure increasing device formed integrally of a cylinder and a piston, the following problems ensue.

Firstly, the pressure increasing device which is integrally composed of a cylinder and a piston suffers from heavy loss of energy and entails large power consumption for driving. Particularly where the pressure of the gas is increased hydraulically, the loss due to energy conversion is large. Where the compressed gas is used in a large amount, the pressure increasing device assumes a large volume and occupies a wide floor area for its installation with a sacrifice of the function as an accessorial contrivance for the injection molding machine and with an increase in the cost of equipment.

Secondly, with the pressure increasing device which is integrally composed of a cylinder and a piston, the magnitude of pressure of the compressed gas supplied into the die and the speed of this supply of the compressed gas are not easily controlled.

Thirdly, the pressure increasing device which is integrally composed of a cylinder and a piston inevitably requires a large capacity in order to ensure rapid increase of pressure necessary for enabling the gas pressure to be increased in a short span of time for the next molding cycle.

SUMMARY OF THE INVENTION

The present invention has been conceived in the urge to solve the various problems of the prior art described above. It is an object of this invention to enable the operation of injection molding a hollow shaped article by supplying not only molten synthetic resin but also compressed gas into the cavity of a die to be accomplished with a highly efficient and compact apparatus capable of enhancing the recovery ratio of the compressed gas from the cavity of the die and, at the same time, facilitating the control of the flow of the compressed gas into and out of the die.

The object described above is accomplished, in injection molding a hollow shaped article by the step of injection of molten synthetic resin, the step of injection of gas, the step of solidification by cooling, the step of discharge of gas, and the step of removal of the shaped article, by a method which comprises carrying out the step of gas injection by causing a gas compressed by means of a multistage compressor to be injected into the die and, at the same time, allowing the compressed gas held inside the hollow shaped article to be recovered in a recovery container connected to the suction side of the multistage compressor via a gas inlet of a gas nozzle while keeping a resin inlet of an injection nozzle and the gas inlet of the gas nozzle pressed against the die at their respective positions to be assumed during the course of compressed gas injection. This method can be easily performed by an apparatus for the molding of a hollow shaped article, which comprises a multistage compressor for admitting a working gas through the suction side thereof and discharging the work in the form of compressed gas through the discharge side thereof, a gas nozzle and an injection nozzle connected to the discharge side of the multistage compressor, a die for admitting molten synthetic resin injecting through the injection nozzle and the compressed gas injected through the gas nozzle, a first switching valve interposed between the discharge side of the multistage compressor and the gas nozzle, and a gas conduit adapted to interconnect the first switching valve and the gas nozzle and extended from the upstream side to the downstream side sequentially through a second switching valve and a recovery container until the leading end thereof joins the suction side of the multistage compressor.

Further scope of applicability of the present invention will become apparent from the detailed description given hereinafter. However, if should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Now, the present invention will be described more specifically below with reference to the accompanying drawings which are given by way of illustration only, and thus are not limitative of the present invention, and wherein:

FIG. 2(a) shows the step of injection of the present invention;

FIG. 2(b) shows the step of gas injection of the present invention;

FIG. 2(c) shows the step of solidification by cooling of the present invention;

FIG. 2(d) shows the step of gas discharge of the present invention;

FIG. 2(e) shows the step of removal of a hollow shaped article of the present invention;

DETAILED DESCRIPTION OF THE PREFERRED EMBODIMENTS

First, the invention of method and the invention of apparatus will be described in detail below.

Figure 1:
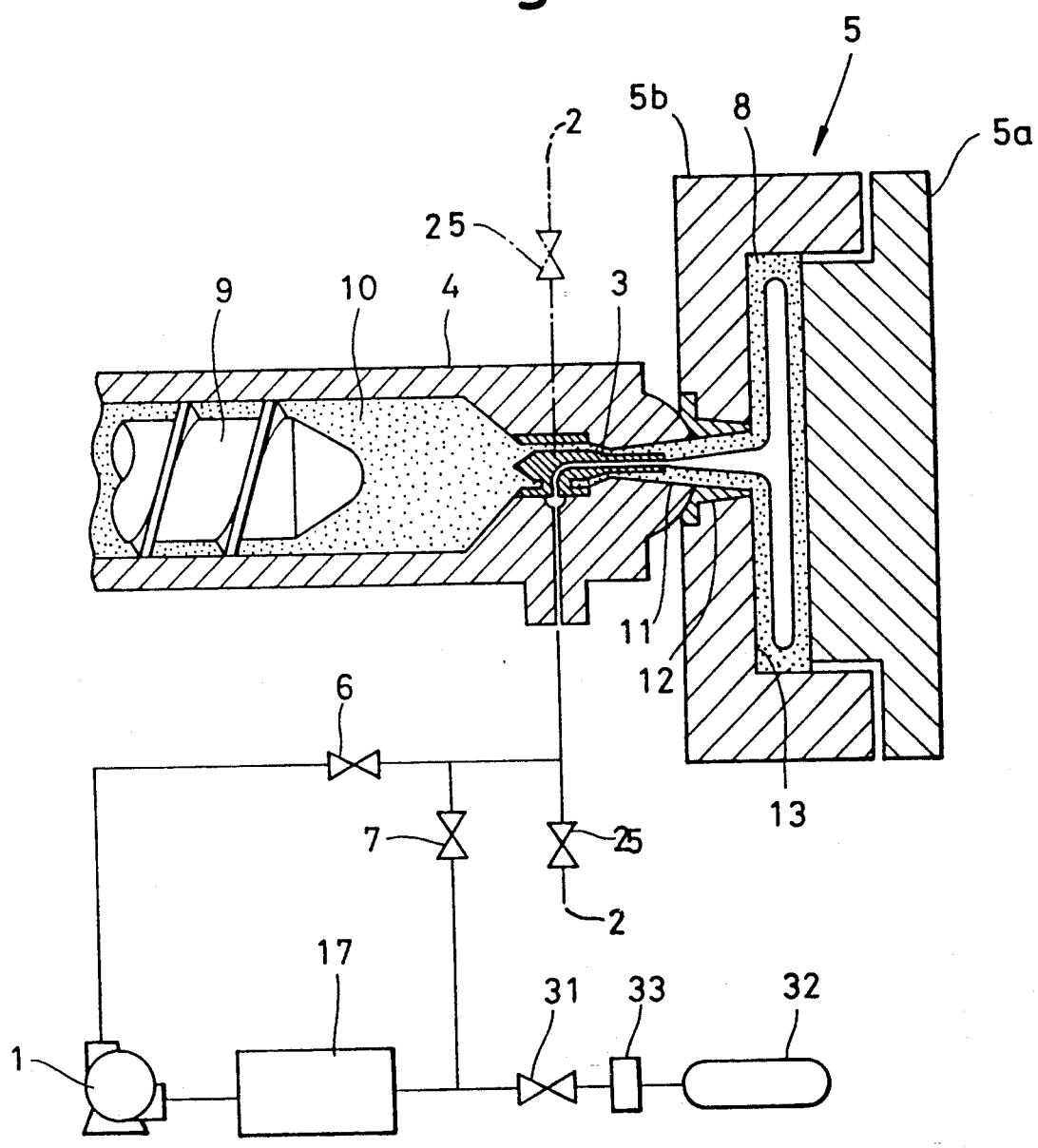
FIG. 1 is a diagram illustrating a typical apparatus as the first embodiment of this invention.

As illustrated in FIG. 1, a die 5 is composed of a removable male segment 5a and a female segment 5b.

An injection nozzle 4 is adapted to spout molten synthetic resin 10 through an injection mouth 11 at the leading end thereof by virtue of the rotation of a screw 9. It is provided with a built-in gas nozzle 3 at a slightly inner position.

This injection nozzle 4 can be moved toward and away from the die 5. The discharge of the molten synthetic resin 10 through the injection nozzle 4 and the injection of compressed gas through the gas nozzle 3 are carried out while the injection nozzle 4 is held at its advanced position and the leading end part thereof is held in a state pressed against a sprue 12 of the die 5.

The gas nozzle 3 enclosed in the injection nozzle 4 is disposed as provided around the periphery thereof with a gap for passing the molten synthetic resin 10 and is adapted to inject the compressed gas into the die 5 through the injection mouth 11 of the injection nozzle 4.

The gas nozzle 3 is connected through a first switching valve 6 to the discharge side of a multistage compressor 1. The multistage compressor 1 may be of reciprocating type, turbo type, or axial flow type on the sole condition that it should be capable of supplying necessary compressed gas through a multiplicity of stages.

A gas conduit having a second switching valve 7 inserted therein interconnects the first switching valve 6 and the gas nozzle 3. This gas conduit has the leading end thereof connected through a recovery container 17 to the suction side of the multi-stage compressor 1. To the recovery container 17 is connected a gas source 32 through a switching valve 31 for supply of gas and a pressure reducing valve 33. Desirably, an open-air discharge valve 25 for emergency use is interposed between the first switching valve 6 and the gas nozzle 3, with the leading end thereof connected to the gas conduit serving as an open-air release outlet 2. Though this open-air discharge valve 25 is not an indispensable component, provision thereof proves to be desirable in that when the recovery of the compressed gas from within the hollow shaped article is not sufficient during the step of gas discharge which will be described specifically hereinafter, the discharge of the compressed gas from within the hollow shaped article can be attained by opening the open-air discharge valve 25. This open-air discharge valve 25 may be attached to the gas conduit which is directly extended from the gas nozzle 3 as indicated by an alternate one-short and one-long dash line in FIG. 1. The expression "interval between the first switching valve 6 and the gas nozzle 3" as used, if not explicitly, in the specification is meant to embrace the gas nozzle 3 itself.

The method of the invention which can be easily performed by the use of the apparatus may be divided into a step of injection, a step of gas injection, a step of solidification by cooling, a step of gas discharge, and a step of removal of a hollow shaped article. The operation of the apparatus as divided by step will be described below along with the invented method.

(1) Step of injection [FIG. 2 (a)]

The die 5 is closed, the injection nozzle 4 advanced, and the leading end of the injection nozzle 4 brought into forced contact with a sprue 12 of the die 5. Then, the screw 9 is operated to inject the molten synthetic resin 10 into the die 5. At this time, the first and second switching valves 6, 7 and the open-air discharge valve 25 are normally held in closed state. As specifically described in the paragraph dealing with the step of gas injection, the first swtiching valve 6 may be opened with a prescribed timing.

The molten synthetic resin 10 for use herein may be the melt of a thermoplastic resin, a thermoplastic elastomer, or a thermosetting resin on the condition that it should be capable of being injection molded. The melt may be used as mixed with the conventional additives and filler. The blend of a thermoplastic resin, a thermoplastic elastomer, known additives, a stabilizer, a filler, and such reinforcing material as glass fibers is used advantageously.

The step of injection may be either injection molding of a single resin (unfoamed or foamed) or composite injection molding of a known multicomponent resin (possibly the combination between same or different non-foaming species, between non-foaming and foaming species, and between foaming and foaming species).

The amount of the molten synthetic resin 10 to be injected into the die 5 may be insufficient for filling up a cavity 13 of the die 5, equal to the inner volume of the cavity 13, or larger than the inner volume of the cavity 13 (so-called overcharging). In case of the amount of injection equal to or greater than the inner volume of the cavity 13, though the hollow part to be formed cannot be expected to be large, it may equal the amount of contraction which occurs in the synthetic resin in consequence of the solidification by cooling.

(2) Step of gas injection [FIG. 2 (b)]

When a multistage compressor 15 is operating and the first switching valve 6 is opened while the leading end part of the injection nozzle 4 is pressed against the sprue 12 of the die 5, the gas supplied in advance from the gas source 32 through the pressure reducing valve 33 and the gas supply switching valve 31 to the recovery container 17 is compressed by the multistage compressor 1 and injected through the gas nozzle 3 into the die 5.

The time for keeping the first switching valve 6 open, namely the time for keeping the injection of the compressed gas, may be (1) the time in which part of the molten synthetic resin 10 necessary for molding is injected and subsequently the remaining part of the molten synthetic resin 10 is injected, (2) the time in which the molten synthetic resin 10 necessary for molding is wholly injected, or (3) the time which follows a stated interval after the injection of the whole amount of the molten synthetic resin 10 necessary for molding, whichever suits occasion most.

By the injection of the compressed gas, a hollow shaped article 8 is allowed to give rise to its hollow part. The pressure of injection and the speed of injection to be used in injecting the compressed gas into the molten synthetic resin 10 injected in advance into the die 5 are desired to be controlled so that the hollow part may be formed at a designed position.

For the compressed gas, such a gas as nitrogen or carbon dioxide which is harmless and is incapable of being liquefied at the molding temperature under the injection pressure is generally used.

(3) Step of solidification by cooling [FIG. 2 (c)]

After the injection of the molten synthetic resin 10 and the injection of the compressed gas are completed, the hollow shaped article 8 freshly formed inside the die 5 is kept in the compressed state and, at the same time, solidified by cooling. In the meantime, the forced contact of the leading end part of the injection nozzle 4 with the sprue 12 is allowed to continue.

This retention of the interior of the hollow shaped article 8 in the compressed state is intended for pressing the outer surface of the hollow shaped article 8 against the inner surface of the cavity 13 and consequently improving the repeatability of shape of molding and is accomplished by controlling the operation of the multistage compressor 1 and controlling the opening and shutting actions of the first and second switching valves 6, 7. Specifically, it is attained by (1) maintaining the pressure during the course of injection, (2) maintaining the pressure at a level slightly lower than the pressure existing during the course of injection, (3) maintaining the pressure at a level slightly higher than the pressure existing during the course of injection, or (4) maintaining the pressure at a level higher than the pressure existing during the course of injection and subsequently continuing the maintenance of the pressure at a lower level, for example.

(4) Step of gas discharge [FIG. 2 (d)]

After the step of solidification of the hollow shaped article 8 by cooling is completed, the recovery of the compressed gas from within the hollow shaped article 8 into the recovery container 17 by keeping the leading end of the injection nozzle 4 pressed against the sprue 12, shutting the first switching valve 6, stopping the multistage compressor 1, and opening the second switching valve 7. When the second switching valve 7 is opened, the compressed gas inside the hollow shaped article 8 is allowed to flow back to the gas nozzle 3 and enter the recovery container 17 through the second switching valve 2.

At this time, the speed of discharge of the compressed gas from within the hollow shaped article 8 can be controlled by adjusting the degree of opening of the second switching valve. In case of using for the first and second switching valves 2, 7 such valves as electromagnetic valves which do not allow adjustment of the degree of opening, the required adjustment can be accomplished with some other valve capable of this adjustment of the degree of opening disposed on the downstream side of the second switching valve 7.

Particularly in the step of gas injection described above, the practice of aspirating the gas from the interior of the recovery container into the multistage compressor 1 until the interior of the recovery container 7 assumes negative pressure proves to be advantageous for the purpose of improving the recovery ratio of the compressed gas from within the hollow shaped article 8.

(5) Step of removal of hollow shaped article [FIG. 2 (e)]

After the compressed gas has been discharged from within the hollow shaped article 8 as described above, the second switching valve 7 is shut and then the die 5 is opened to allow removal of the hollow shaped article 8. This removal of the hollow shaped article may be carried out either while the injection nozzle 4 is kept pressed against the sprue 12 or after the injection nozzle 4 has been retracted to the home position. When the removal is made while the injection nozzle 4 is kept pressed against the sprue 12, the die 5 is shut and the operation is returned to the step of injection of the molten synthetic resin. When the removal is made after the retraction of the injection nozzle 4 to the home position, the die 5 is shut and the injection nozzle 4 is brought into forced contact with the die 5 either before or after the closure of the die 5 and the operation is returned to the step of injection of the molten synthetic resin.

The amount of the compressed gas to be recovered slightly decreases owing to leakage from the die 5, for example. To make up for this shortage, the compressed gas held inside the recovery container 17 may be replenished with the gas freshly supplied from the gas source 32 in an amount proportionate to the amount lost by the leakage.

Figure 3:
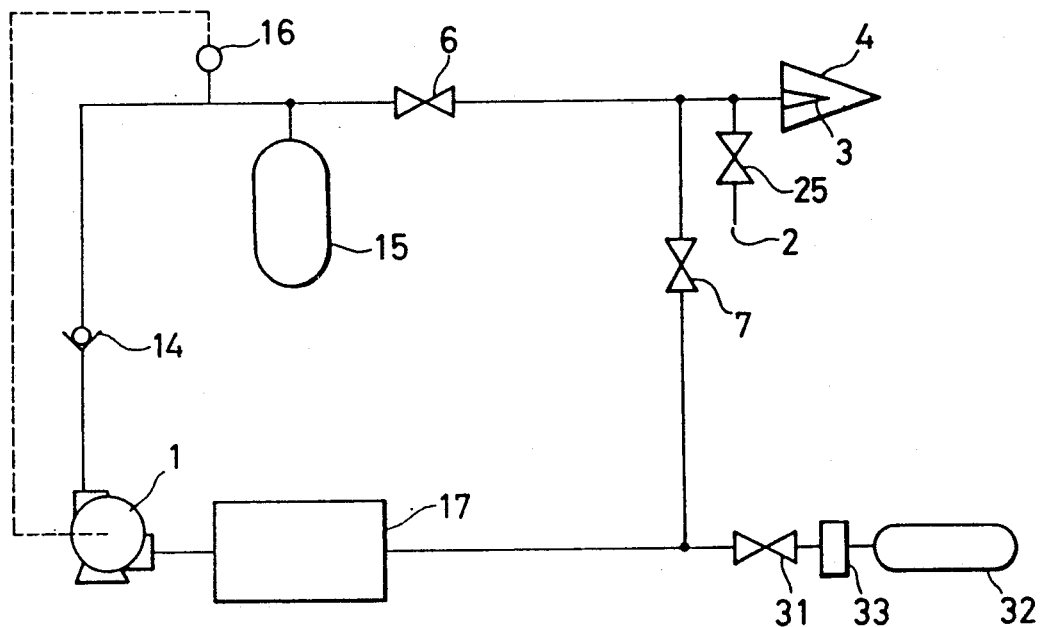
FIG. 3 shows a typical apparatus of a second embodiment of the present invention.

FIG. 3 illustrates a typical apparatus of a second embodiment of this invention. This apparatus is basically identical with that which has been described with reference to FIG. 1, excepting a check valve 14 is interposed between the first switching valve 6 and the multistage compressor 1 more closely to the compressor 1 and a pressure accumulating container 15 is disposed to interconnect the first switching valve 6 and the check valve 14.

By keeping the multistage compressor 1 in operation even while the first switching valve 6 is kept in the shut state, the pressure accumulating container 15 is enabled, owing additonally to the fact that the check valve 14 prevents the compressed gas from flowing backwardly, to accumulate the compressed gas emanating from the multistage compressor 1 with proportionate addition to the pressure of the compressed gas. For the purpose of ensuring safety of the pressure accumulating container 15 by enabling the compressed gas accumulated in the pressure accumulating container 15 to escape confinement therein when the pressure of the accumulated compressed gas rises to an excess, it is desirable to interpose a pressure switch 16 between the first switching valve 6 and the check valve 14. This relief valve-incorporating pressure switch 16 fulfils the purpose of stopping the multistage compressor 1 when the gas pressure reaches the level set in advance on the pressure switch and subsequently opens the relief when the pressure continues to rise and eventually reaches a dangerous level.

With the apparatus contemplated as the second embodiment of this invention, the recovery ratio of the gas can be improved particularly during the step of gas discharge by keeping the multistage compressor 1 in operation thereby continuing the accumulation of the compressed gas in the pressure accumulating container 15 and, at the same time, continuing the aspiration of the gas into the recovery container 17. In this case, the recovery of the compressed gas can be continued until the interior of the hollow shaped article 8 (FIG. 1) assumes negative pressure.

Figure 4:
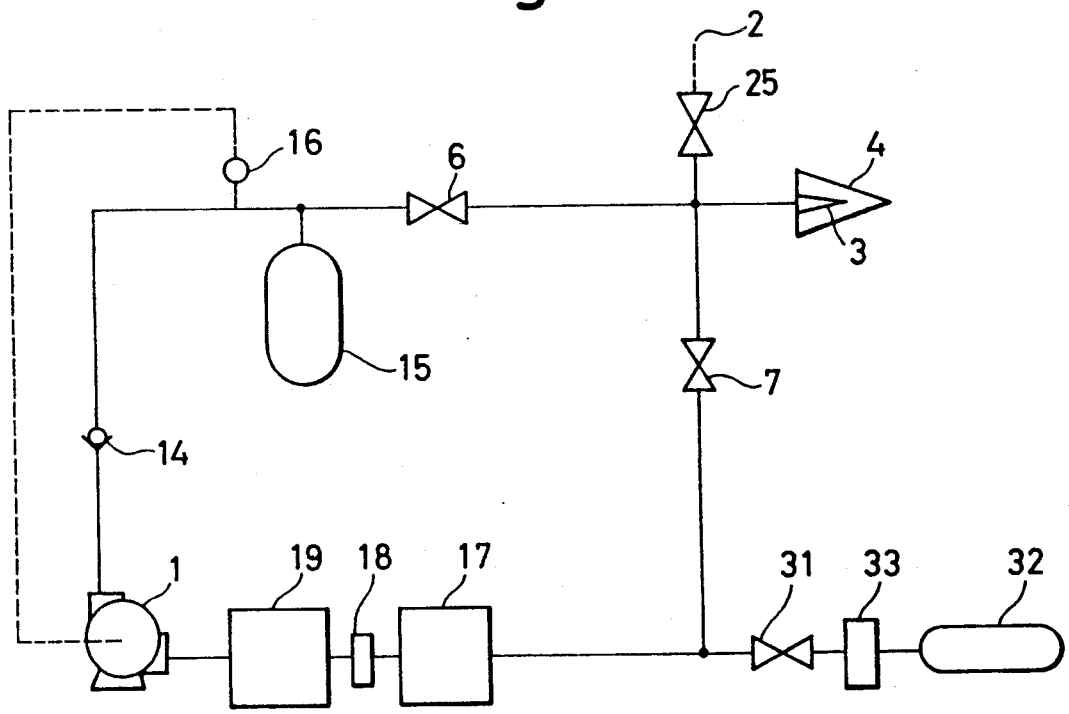
FIG. 4 shows a typical apparatus of a third embodiment of the present invention.

FIG. 4 illustrates a typical apparatus of a third embodiment of this invention. This apparatus is basically identical with the apparatus described above with reference to FIG. 3, excepting a pressure reducing valve 18 and an auxiliary recovery container 19 are disposed on the downstream side of the recovery container 17 sequentially from the upstream side to the downstream side.

The recovery containing 17 discharges the part of admitting the compressed gas being recovered under relatively high pressure, the pressure reducing valve 18 the part of reducing the pressure of the recovered gas and forwarding the gas of reduced pressure to the auxiliary container 19, and the auxiliary container 19 the part of storing the gas of amply reduced pressure and supplying it to the suction side of the multistage compressor 1. When the gas is forwarded with reduced pressure to the multistage compressor as described above, the multistage compressor 1 is allowed to operate safely even when the suction side of the multistage compressor 1 has no appreciably high resistance to pressure. Optionally, the auxiliary recovery container 19 may be omitted and the pressure reducing valve 18 adapted to forward the gas of reduced pressure directly to the suction side of the multistage compressor 1.

Figure 5:
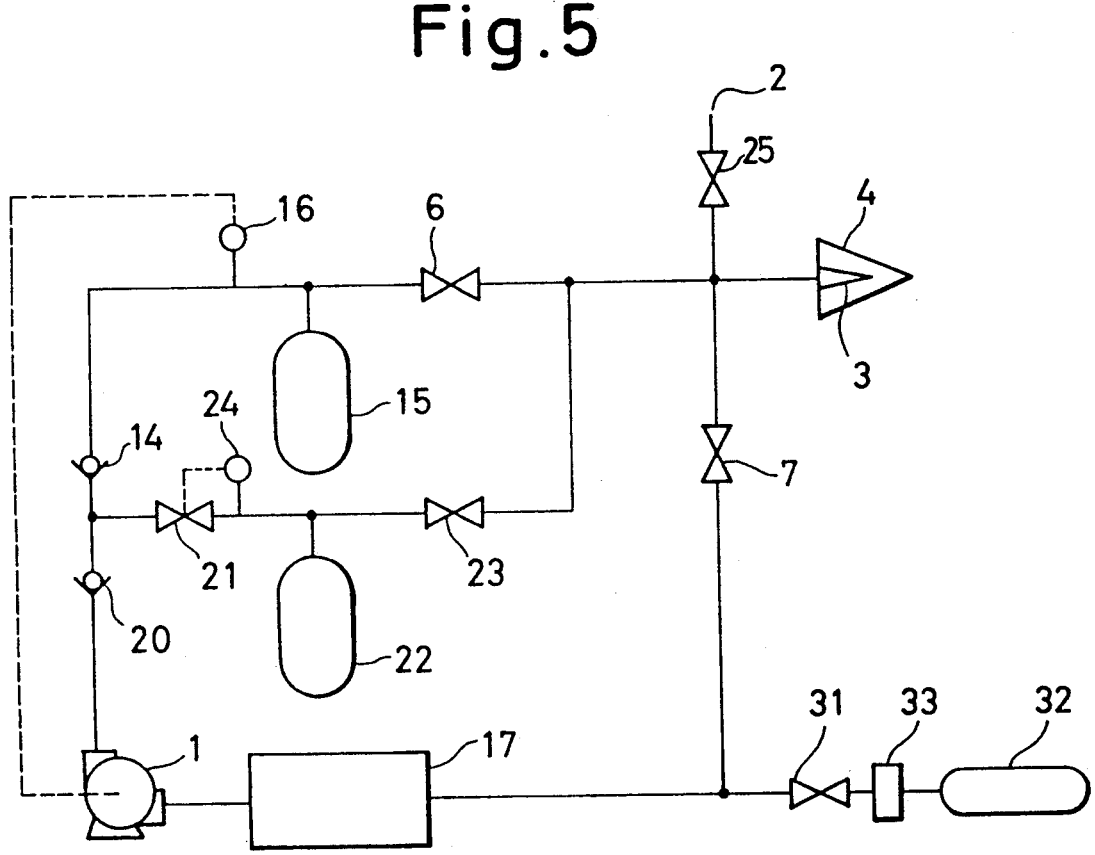
FIG. 5 shows a typical apparatus of a fourth embodiment of the present invention.

FIG. 5 illustrates a typical apparatus representing a fourth embodiment of the present invention. This apparatus is basically identical with the apparatus illustrated in FIG. 3, excepting an auxiliary check valve 20 is interposed between the discharge side of the multistage compressor 1 and the check valve 14 and the conduit intervening between the two check valves 14, 20 and the conduit intervening between the first switching valve 6 and the gas nozzle 3 are interconnected with a gas conduit having a third switching valve 21, an auxiliary pressure accumulating container 22, and a fourth switching valve 23 inserted therein as arranged sequentially in the order mentioned from the upstream side to the downstream side.

The auxiliary check valve 20 and the auxiliary pressure accumulating container 22, similarly to the check valve 14 and the pressure accumulating container 15 mentioned above, serve the purpose of storing the compressed gas and adding to the pressure thereof. Their operation is initiated by shutting the first and fourth switching valves and, at the same time, opening the third switching valve 21 and setting the multistage compressor 1 into operation. Since the third switching valve 21 is disposed on the downstream side of the auxiliary pressure accumulating container 22, this auxiliary pressure accumulating container 22 is enabled to store the compressed air at lower pressure than the pressure accumulating container 15 by shutting the third switching valve 21. The compressed gas of this low pressure can be supplied to the gas nozzle 3 by opening the fourth switching valve with the first and third switching valves 15, 21 kept in the shut state.

For the purpose of preventing excessive rise of pressure in the auxiliary pressure accumulating container 22 similarly to the pressure accumulating container 15, it is desirable to interpose a pressure switch 24 incorporating a relief valve therein between the third switching valve 21 and the fourth switching valve 23 and consequently causing the third switching valve 21 to be shut when the pressure of the compressed gas reaches a danger level set in advance.

The fourth embodiment of this invention is basically identical with the apparatus illustrated in FIG. 3, excepting the auxiliary check valve 20 and a gas conduit provided with the third switching valve 21, the auxiliary pressure accumulating container 22, and the fourth switching valve 23 are additionally incorporated therein. Optionally, the apparatus illustrated in FIG. 4 may be modified by additional incorporation therein of a gas conduit provided with the aforementioned auxiliary check valve 20 and the aforementioned third switching valve 21.

The gas conduit provided with the third switching valve 21, the auxiliary pressure accumulating container 22, and the fourth switching valve 23 may have the upstream end thereof connected not to between the first switching valve 6 and the gas nozzle 3 but to between the second switching valve 7 and the gas nozzle 3. The expression "between the second switching valve 7 and the gas nozzle 3" as used herein is meant to include the gas nozzle 3 itself similarly to the aforementioned expression "between the first switching valve 6 and the gas nozzle 3."

In accordance with the fourth embodiment, the pressure and speed of the gas to be injected can be easily controlled. Specifically by setting the pressure accumulating container 15 at high pressure and the auxiliary pressure accumulating container 22 at low pressure, the compressed pressure can be injected at low pressure and low speed from the auxiliary pressure accumulating container 22 and then the compressed gas can be injected a high pressure and high speed from the auxiliary pressure accumulating container 15. After the hollow par has been formed, part of the gas may be recovered in the auxiliary pressure accumulating container 22.

Further, by the fourth embodiment, the balanced gas pressure can be easily controlled during the introduction of the gas from the pressure accumulating container 15 into the die 5 (FIG. 1).

To be specific, the balanced gas pressure due to the introduction of the gas from the pressure accumulating container 15 can be controlled (i) by using the pressure accumulating container 15 of large capacity adapted for high pressure and the auxiliary pressure accumulating container 22 of small capacity adapted for high pressure and introducing the compressed gas simultaneously or sequentially from the pressure accumulating container 15 and auxiliary pressure accumulating container 22 (with the order possibly reversed) or (ii) by giving an equal capacity to the pressure accumulating container 15 and the auxiliary pressure accumulating container 22 and introducing the accumulated compressed gas either simultaneously or sequentially thereby allowing the balanced gas pressure to be controlled by the introduction of gas from the pressure accumulating container 15.

In case of operating the pressure accumulating container 15 and the auxiliary pressure accumulating container 22 under an equal pressure, for example, when the compressed gas is sequentially injected, namely when the compressed gas is introduced by opening the first switching valve 6 connected to the pressure accumulating container 15, then the first switching valve 6 is closed, and subsequently the compressed gas is introduced by opening the fourth switching valve 23 connected to the auxiliary pressure accumulating container 22, the balanced gas pressure can be maintained at higher level than when the compressed gas is introduced simultaneously from the pressure accumulating container 15 and the auxiliary pressure accumulating container 22. As a result, the volume of the hollow part of the hollow shaped article 8 (FIG. 1) can be increased and the cave-in of the surface of the hollow shaped article 8 can be decreased. The term "balanced gas pressure" as used herein refers to the balanced pressure in the pressure accumulating container 15, the piping, and the hollow part of the hollow shaped article 8.

By the present embodiment, the gas pressure in the hollow part of the hollow shaped article 8 can be controlled during the step of cooling. This control is attained (1) by maintaining the balanced presssure during the course of the compressed gas, (2) by maintaining the pressure at a level slightly lower than the pressure existing during the introduction of the compressed gas, (3) by maintaining the pressure at a level higher than the level existing during the introduction of the compressed gas and thereafter changing the pressure to a lower level.

The control by the measure of (1) can be accomplished by opening the pressure accumulating container 15 and either or both of the first and fourth switching valves 6, 23 of the auxiliary pressure accumulating container 22 and, after the balanced pressure is reached, shutting the first and fourth switching valves 6, 23. After the first and fourth switching valves 6, 23 have been shut, the compressed gas may be supplied from the multistage compressor 1 to the pressure accumulating container 15 and the auxiliary pressure accumulating container 22 to increase the pressure in preparation for the next step.

The control by the measure of (2) is accomplished by setting the pressure accumulating container 15 and the auxiliary pressure accumulating container 22 respectively at high level and at slightly low level thereby inducing the passage of the compressed gas from the container of high pressure to the container of low pressure and thereafter recovering part of the compressed gas in the container of low pressure. As a result, the possibility of the shaped article sustaining distortion can be decreased.

The control by the measure of (3) is effected by initiating the introduction of the compressed gas first from the container of low pressure and then from the container of high pressure and thereafter recovering part of the compressed gas in the container of low pressure. By this procedure, the possibility of the gas thrusting through the end of the flow of the molten synthetic resin 10 before the end of the flow reaches the wall of the die can be precluded. It also serves the purpose of shortening the time required for the step of gas discharged.

In the apparatuses illustrated in FIG. 1 and FIGS. 3 to 5, the gas conduit on the first switching valve 6 side is invariably branched and connected to the suction side of the multistage compressor 1. In this case, the first switching valve 6 and the second switching valve 7 may be omitted by disposing a switching valve at the point of branching. In other words, the switching valve inserted at the point of branching can be used in the place of the first switching valve 6 and the second switching valve 7.

Figure 6:
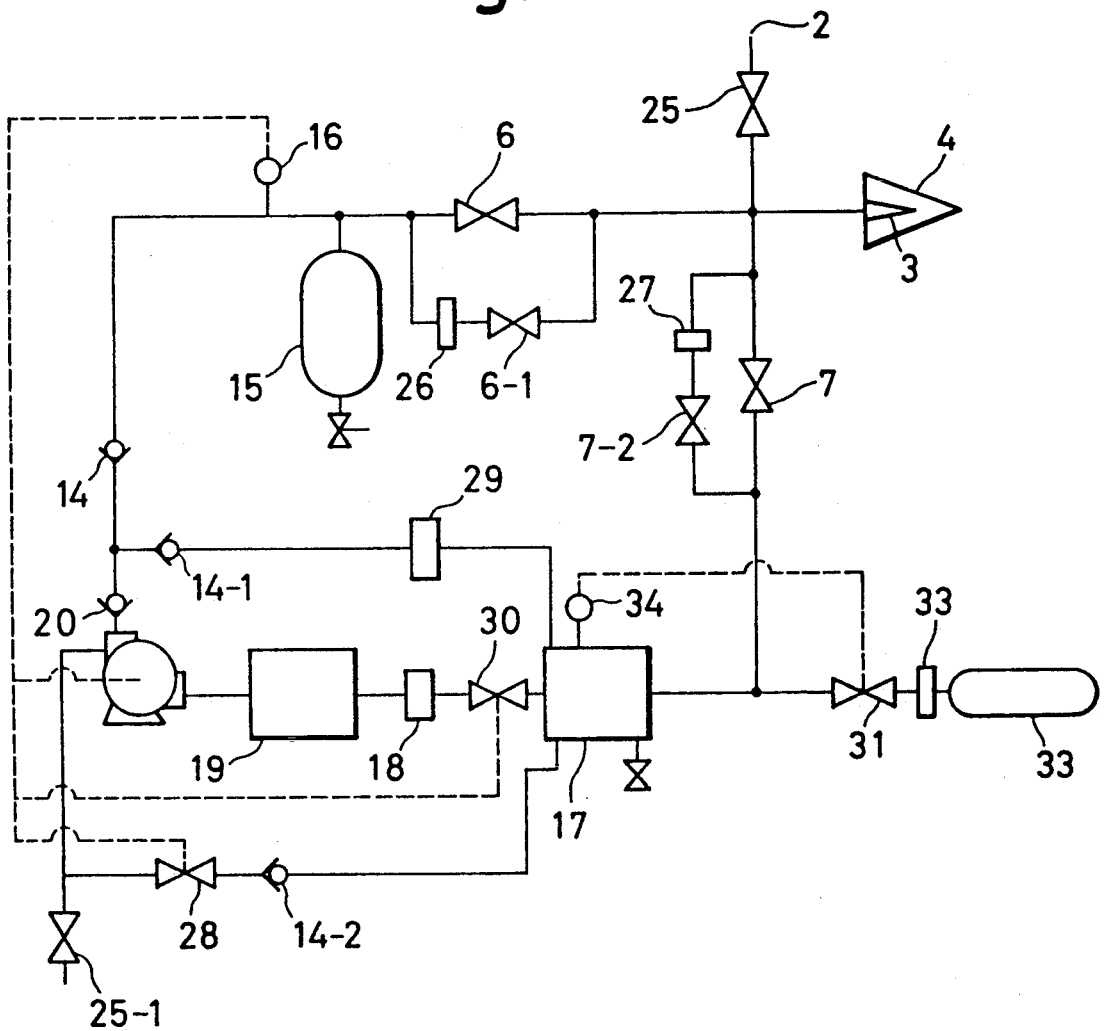
FIG. 6 shows a typical apparatus of a fifth embodiment of the present invention.

FIG. 6 illustrates a typical apparatus of a fifth embodiment of this invention. This apparatus is basically identical in construction with the apparatus of FIG. 4, excepting it allows various operational procedures. The only parts of the present apparatus which differentiate this apparatus from that of FIG. 4 will be described below.

A gas conduit is disposed to interconnect the recovery container 17 and the line intervening between the auxiliary check valve 20 and the check valve 14 incorporated in the gas conduit on the discharge side of the multistage compressor 1. In this gas conduit, a check valve 14-1 and a back-pressure valve 29 are inserted as arranged in the departing order from the multistage compressor 1 side. Further, a gas conduit is laid to interconnect the recovery container 17 and the line intervening between the discharge side of the multistage compressor 1 and the auxiliary check valve 20. In this gas conduit, a fifth switching valve 28 and a check valve 14-2 are inserted as arranged as departing order from the multistage compressor 1 side. Morever, an open-air discharge valve 25-1 is interposed between the multistage compressor 1 and the fifth switching valve 28. A sixth switching valve 30 is interposed between the pressure reducing valve 18 and the recovery container 17. The sixth switching valve 30 is shut and the aforementioned fifth switching valve 28 is opened conversely as soon as the pressure switch 16 provided with a relief valve, on detecting the rise of the pressure to the preset danger level, stops the multistage compressor 1.

A gas conduit is laid to interconnect the line intervening between the pressure accumulating container 15 and the first switching valve 6 and the line intervening between the first switching valve 6 and the gas nozzle 3. In this gas conduit, a pressure adjusting valve 26 and the first auxiliary switching valve 6-1 are inserted. This gas conduit discharges the role of a bypass. A similar gas conduit is laid on the second switching valve 7 side. More specific, this gas conduit is disposed to interconnect the line intervening between the gas nozzle 3 and the second switching valve 7 and the line intervening between the second switching valve 7 and the recovery container 17. In this gas conduit, a pressure adjusting valve 27 and the second auxiliary switching valve 7-2 are inserted as arranged in the order mentioned from the gas nozzle 3 side.

Further, to the recovery container 17, a pressure switch 34 is provided with a relief valve. It is by this pressure switch 34 that the switching valve 31 for gas supply is opened and shut.

Now, the operation of the apparatus contemplated as the fifth embodiment and the procedure of this operation will be described below.

(1) Preparation for operation

First the pressure inside the pressure accumulating container 15 is increased by starting the multistage compressor 1. At this time, all of the switching valves remain in the shut state except for the sixth switching valve 30 which is opened as soon as the multistage compressor 1 is started. When the multistage compressor 1 is started and, as the result, the pressure within the recovery container 17 is lowered and brought to the lower limit (1 kg/cm$^2$ G, for example, set in advance on the pressure switch 34 provided with the relief valve, the gas supply switching valve 31 is opened and the gas from the gas source 32 (such as, for example, a nitrogen gas cylinder) is given reduced pressure (2 to 5 kg/cm$^2$ G, for example) by the pressure reducing valve 33 and supplied with the reduced pressure to the recovery container 17. When the pressure inside the recovery container 17 is increased by this supply of the gas and raised to the upper limit (such as, for example, 2 kg/cm$^2$ G) set on the pressure switch 34 provided with the relief valve, the gas supply switching valve 31 is shut.

The gas inside the recovery container 17 is advanced through the sixth switching valve 30 and the pressure reducing valve 18, passed through the auxiliary recovery container 19, and aspirated to the suction side of the multistage compressor 1. Then, the compressed gas given increased pressure by the multistage compressor 1 is forwarded from the discharge side of the multistage compressor 1 through the auxiliary check valve 20 and the check valve 14 to the pressure accumulating container 15, there to be accumulated.

Generally, the multistage compressor 1 is stopped and the sixth switching valve 30 is shut when the pressure within the pressure accumulating container 15 is raised to the set level (200 kg/cm$^2$ G, for example) owing to the operation of the pressure switch 16 provided with the relief valve and adapted to sense the pressure container 15. At the same time, the fifth switching valve 28 is opened and the compressed gas inside the multistage compressor 1 is returned to the recovery container 17. This flow of the compressed gas is aimed at lowering the pressure inside the multistage compressor 1 and consequently facilitating the start of the multistage compressor 1 for the next cycle. When reduction of the pressure inside the multistage compressor 1 is not sufficient, further reduction of this pressure can be attained by opening the open-air discharge valve 25-1.

Alternatively, there may be adapted a method which enables the operation to be continued without entailing a stop of the multistage compressor 1 by opening the back-pressure valve 29 adapted to actuate at a pressure (195 kg/cm$^2$ G, for example) lower than the preset value thereby causing the compressed gas given increased pressure by the multistage compressor 1 to be returned to the recovery container 17 before the pressure within the pressure accumulating container 15 reaches the level set on the pressure switch 16 provided with the relief valve. In this case, the sixth switching valve 30 is kept in the opened state and the fifth switching valve 28 is kept in the shut state.

When the pressure of the compressed gas is accumulated to the level set in the pressure accumulating container 15 in consequence of the operation described above, the preparation of the apparatus is completed.

(2) Step for injection

The operation of this step is carried out in the same manner as described above.

(3) Step for injection of gas

When the screw 9 illustrated in FIG. 1 is advanced to the prescribed position to effect forced introduction of the molten synthetic resin 10 through the injection nozzle 4 into the die 4, a signal is issued for starting the forced introduction of the molten synthetic resin 10. The first switching valve 6 is opened at the same time or after this forced introduction is completed. As the result, the compressed gas accumulated in the pressure accumulating container 15 is injected through the gas nozzle 3 and the injection nozzle 4 into the die 5. The compressed gas then finds its way into the die in such a manner as to be enclosed with the mass of the molten synthetic resin 10.

In the operational method which causes temporary stop of the multistage compressor 1 on completion of the preparation of the apparatus for operation, the aforementioned forced introduction of the compressed gas induces a reduction of the gas pressure inside the pressure accumulating container 15. This reduction of the gas pressure continues until the pressure in the pressure accumulating container 15 is equilibrated with the pressure inside the hollow part formed within the molten synthetic resin 10 inside the die 5. The first switching valve 6 is shut when the pressure inside the pressure accumulating container 15 reaches the balanced pressure. When the pressure inside the pressure accumulating container 15 has been thence reduced to the lower limit set in advance on the pressure switch 16 provided with the relief valve (190 kg/cm² G, for example), the multistage compressor 1 is started and, at the fifth switching valve 28 is shut and the sixth switching valve is opened to allow accumulation of the compressed gas within the pressure accumulating container 15.

In the operational method which effects the return of the compressed gas through the aforementioned back-pressure valve 29 into the recovery container, when the gas pressure inside the pressure accumulating container 15 is lowered by the aforementioned forced introduction of the compressed gas, the back-pressure valve 29 is shut and the supply of the compressed gas from the multistage compressor 1 to the pressure accumulating container 1 is initiated. Then, owing to the pressure which opens the back-pressure valve 29, the pressure within the pressure accumulating container 15 is balanced with the pressure inside the hollow part formed within the mass of molten synthetic resin 10 within the die 5 and the forced introduction of the compressed gas is completed by the closure of the first switching valve 6.

In the apparatus of FIG. 6, the first auxiliary switching valve 6-1 may be opened before the first switching valve 6 is opened, depending on the shape of the hollow shaped article 8. Specifically, the compressed gas given adjusted pressure (120 kg/cm² G, for example) by the pressure adjusting valve 26 is supplied to the gas nozzle 3 (for 3 seconds, for example) to form a hollow part of a slightly small size. Then, the first auxiliary switching valve 6-1 is closed and the first switching valve 6 is opened to cause forced introduction of the compressed gas (190 kg/cm² G, for example) in the pressure accumulating container 15 through the gas nozzle 3 within the injection nozzle 4 into the mass of molten synthetic resin 10 within the die 5, with the result that the hollow part of slightly small size formed inside the mass of molten synthetic resin 10 is further flared. This procedure may be otherwise accomplished by furnishing the first auxiliary switching valve 6-1 with a throttle valve (not shown) thereby allowing control of the flow rate of the compressed gas being introduced under pressure.

By the operation described above, the following effect is brought about. To be specific, when the pressure of the gas being forced into the mass of molten synthetic resin 10 is excessively high, there arises the possibility that the flow of the gas will outrun the flow of the molten synthetic resin 10 inside the die 5 and the leading end of the flow of the gas will thrust out the leading end of the flowing mass of molten synthetic resin 10 before the leading end of the molten synthetic resin 10 collides against the wall of the die. The pressure of the molten synthetic resin 10 within the die 5 can be balanced with the gas pressure and the thrust of the gas through the leading end part of the flow of the molten synthetic resin can be prevented by keeping the gas pressure during the initial stage of the forced introduction from increasing to an excess by virtue of the pressure of the molten synthetic resin 10 within the die 5.

(4) Step of solidification by cooling

After the first switching valve 6 is shut, it is allowed to stand in the closed state for a necessary time (about 40 seconds, for example) while the gas pressure is maintained and the molten synthetic resin in the die 5 is solidified by cooling.

Instead of keeping the gas pressure for a necessary time such as, for example, 40 seconds after the closure of the first switching valve 6, it is permissible to employ a procedure which comprises opening the second auxiliary switching valve 7-2 prior to the second switching valve 7 after 10 seconds, for example, recovering the gas in the recovery containing 17 until the pressure of the compressed gas in the hollow part of the hollow shaped article 8 decreases to the level (30 kg/cm² G, for example) set on the pressure adjusting valve 27, then closing the second auxiliary switching valve 7-2 after a necesary time (30 seconds, for example), opening the second switching valve 7, recovering the compressed gas in the hollow part to the pressure to be balanced with the pressure in the recovery container 17, and then shutting the second switching valve 7. Instead of this procedure, it is permissible to employ a procedure which comprises shutting the first switching valve 6 during the retention of the gas pressure, opening the second switching valve 7 briefly (for 10 seconds, for example) after closure of the first switching valve 6 thereby lowering the retained gas pressure, then shutting the second switching valve 7, opening the second switching valve 7 on elapse of 30 seconds, for example, and recovering the compressed gas in the hollow part within the die until the pressure of the compressed gas is balanced with the pressure in the recovery container 17.

From this operation is derived the following effect.

(1) In the step for recovering the compressed gas in the hollow part of the die 5 until it is balanced with the pressure in the recovery container 17, the time for the compressed gas to pass through the slender orifice of the gas nozzle 3 within the injection nozzle 4 and, as the result, the cycle of molding is prolonged.

This problem is solved by making early recovery of the greater part of the compressed gas in the hollow part within the die 5 during the retention of the gas pressure thereby shortening the time for recovery of the gas during the last state which affects the molding cycle.

(2) In the thick-wall part of the hollow shaped article 8, a hollow part is formed in consequence of the flow of the molten synthetic resin 10 during the initial state of the forced introduction of the molten synthetic resin 10 and the gas into the die 5. When excessively high gas pressure is retained even after the cooling of the molten synthetic resin 10 within the die 5 has advanced to an appreciable extent, the molten synthetic resin 10 is hardened so much as to refuse to flow (movement), with the possible result that the gas of high pressure will penetrate and crack the core of a resin. As the result, the peripheral part of the molten synthetic resin 10 and that of the hollow part formed during the initial stage of the forced introduction of the gas are flushed and the hollow shaped article 8 sustains bubble blisters, depending on the kind of resin used. This phenomenon occurs when the gas which has penetrated in the core of resin is forced to remain in the resin during the discharge of the gas and give rise to bubbles during the removable of the removal hollow shaped article from the die 5.

This problem is solved by the aforementioned procedure which requires the pressure of the gas for supply to the hollow part to be lowered after the hollow part has been formed by the forced introduction of the molten synthetic resin and the gas into the die 5.

(5) Step for discharge of gas

The second switching valve 7 is opened and the compressed gas existent in the hollow shaped article 8 within the die is recovered in the recovery container 17.

(6) Step for removal of shaped article

After the operation mentioned above is completed, the die 5 is opened and the hollow shaped article 8 is removed in the manner described above.

Figure 7:
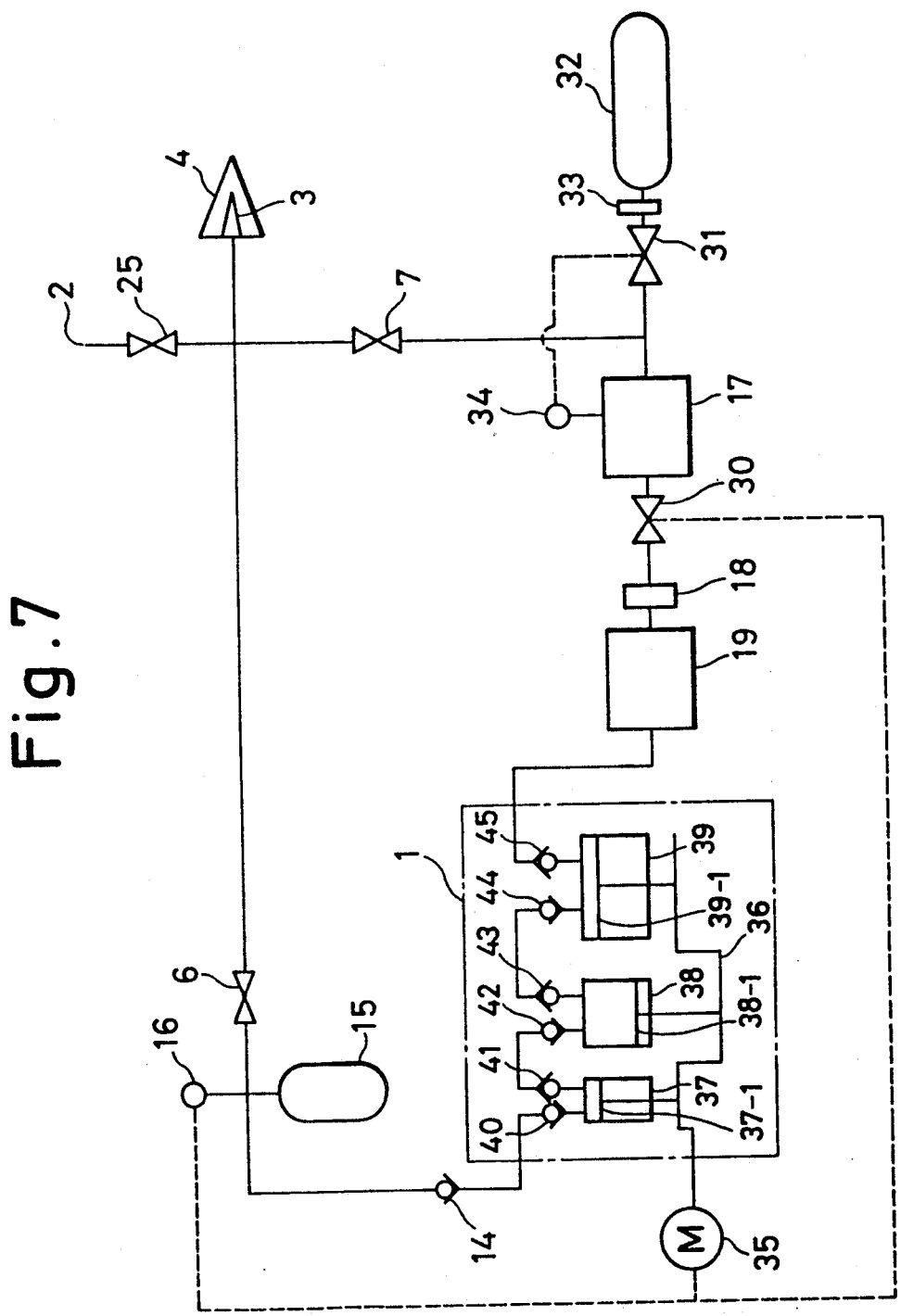
FIG. 7 shows a typical apparatus of a sixth embodiment of the present invention.

FIG. 7 illustrates a typical apparatus of a sixth embodiment of this invention. This apparatus is identical with the apparatus of FIG. 4, excepting the multistage compressor 1 is of a reciprocating type, the sixth switching valve 30 is interposed between the recovery container 17 and the pressure reducing valve 18, and the pressure switch 34 provided with a relief valve and adapted to open or shut the switching valve 31 is furnished for the recovery container.

The multistage compressor 1 of the reciprocating type illustrated in the diagram will be described. By the driving of a motor 35, a crank shaft 36 is rotated and, as the result, first through third compression pistons 39-1, 38-1, and 37-1 in the first through third compression cylinders 39, 38, and 37 are driven. The gas is aspirated through a first suction valve 45 into the first compression cylinder 39 and compressed therein. It is then advanced from a first discharge valve 44 through a second suction valve 43 into the second compression cylinder 38 and compressed therein. Subsequently, the gas is advanced from the second discharge valve 42 through a third suction valve 41 into the third compression cylinder 37 and compressed therein. The compressed gas which has been given increased pressure by the third compression cylinder 37 is forwarded through the third discharge valve 40.

The sixth switching valve 30 and the relief valve pressure switch 34 are similar to those already described with reference to FIG. 6 and the other component parts are similar to those of FIG. 4.

Figure 8:
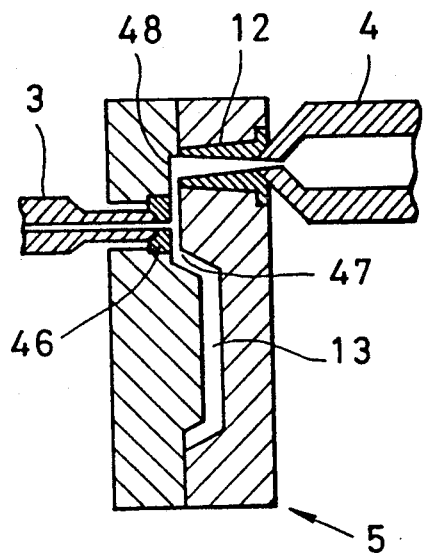
FIG. 8 shows an embodiment with the gas nozzle disposed separately of the injection nozzle.
Figure 9:
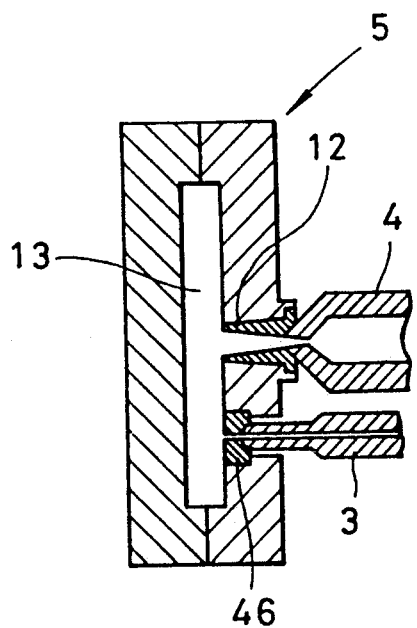
FIG. 9 shows another embodiment with the gas nozzle disposed separately of the injection nozzle.

The gas nozzle 3 has been described as being enclosed with the injection nozzle 4. In other embodiments illustrated in FIG. 8 and FIG. 9, the gas nozzle 3 may be disposed separately of the injection nozzle 4, held in tight contact with a receiving part 46 of the die 5, and connected as to a runner 48 interposed between the sprue 12 and a gate 47 or directly into the cavity 13.

Figure 10:
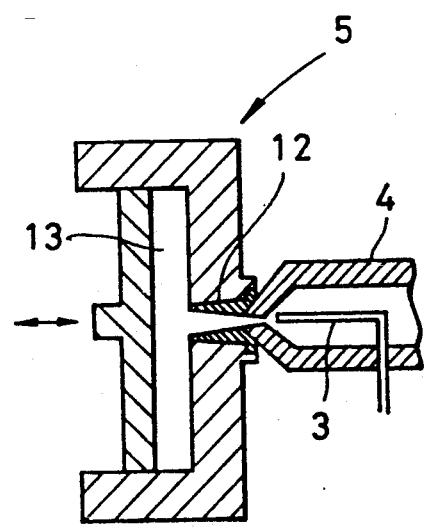
FIG. 10 shows yet another embodiment which uses an expandable die.

In yet another embodiment illustrated in FIG. 10, the cavity 13 may be formed of an expandable die 5, enlarged gradually in consequence of the forced introduction of the compressed gas so as to give rise to a hollow shaped article 8 provided with a large hollow part. Otherwise, the formation of the hollow shaped article 8 may be attained by causing the cavity 13 to be contracted during the injection of the molten synthetic resin 10 and to be gradually expanded simultaneously with the forced introduction of the compressed gas.

Though the illustrated apparatus is so configured as to effect the injection of the compresssed gas one point at one point, the injection may be made at two or more points.

In accordance with this invention, the energy to be consumed in the supply of the compressed gas can be decreased and, at the same time, the control of the inflow and outflow of the compressed gas and the improvement in the recovery ratio of compressed gas can be attained easily by the utilization of the multistage compressor 1. Thus, the hollow shaped article of excellent quality can be produced without wasting the compressed gas. Further, this invention allows accumulation of the compressed gas during the step of gas discharge which has been heretofore attained only with difficulty and, consequently, shortens the molding cycle and heightens the efficiency of molding.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for injection molding of a hollow shaped article comprising the steps of:
    injecting molten synthetic resin through an injection nozzle into a die;
    injecting compressed gas by a multistage compressor through a gas nozzle into said die, the compressor increasing the pressure of the gas;
    solidifying the synthetic resin by cooling said molten synthetic resin within said die;
    discharging gas from the formed hollow shaped article in said die the step of gas discharging further comprising recovering the compressed gas from the hollow shaped article through a gas inlet into a recovery container connected to a suction side of said multistage compressor wherein gas flows from the recovery container to the multistage compressor while keeping forced contact between a resin inlet of said injection nozzle and said die and between the gas inlet of said gas nozzle and said die in the respective positions assumed during the forced introduction of said compressed gas; and
    removing the hollow shaped article from the die.

2. The method according to claim 1, further comprising the step of creating negative pressure in said recovery container during the step of gas injection by aspirating gas from within said recovery container by said multistage compressor.

3. The method according to claim 1, wherein said step of gas injection is effected by accumulating the compressed gas given increased pressure by said multistage compressor in a pressure accumulating container connected to the discharge side of said multistage compressor and injecting the compressed gas accumulated in said pressure accumulating container into said die.

4. The method according to claim 3, further comprising the step of continuously supplying said compressed gas from said multistage compressor to said pressure accumulating container even during said step of gas injection.

5. The method according to claim 1, further comprising the steps of injecting said compressed gas of slightly low pressure into said die and then injecting said compressed gas of higher pressure into said die during the step of gas injection.

6. The method according to claim 1, further comprising the step of removing part of said compressed gas in said hollow shaped article during said step of solidifying by cooling.

7. An apparatus for injection molding a hollow shaped article, comprising a multistage compressor for admitting gas through a suction side thereof and emitting compressed gas through a discharge side thereof, a gas nozzle being connected to the discharge side of said multistage compressor, a die for admitting molten synthetic resin from an injection nozzle and compressed gas from said gas nozzle, a first switching valve interposed between the discharge side of said multistage compressor and said gas nozzle, and a gas conduit interconnecting said first switching valve, said gas nozzle, and said multistage compressor, said gas conduit having a second switching valve and a recovery container disposed therein, the recovery container being disposed between the second switching valve and the multistage compressor, and one end of the gas conduit being connected to the suction side of said multistage compressor such that gas flows from the recovery container to the multistage compressor.

8. The apparatus according to claim 7, wherein a check valve and a pressure accumulating container are disposed between the discharge side of said multistage compressor and said first switching valve, the check valve being between the pressure accumulating container and the multistage compressor.

9. The apparatus according to claim 7, wherein a pressure reducing valve and an auxiliary recovery container are disposed between the suction side of said multistage compressor and said second switching valve, the auxiliary recovery container being between the pressure reducing valve and the multistage compressor.

10. The apparatus according to claim 8, wherein the auxiliary check valve is interposed between the discharge side of said multistage compressor and said check valve and a gas conduit having a third switching valve, an auxiliary pressure accumulating container and a fourth switching valve are disposed between a line between said check valve and the auxiliary check valve and a line between said first switching valve or said second switching valve and said gas nozzle, the auxiliary pressure accumulating container being between the third switching valve and the fourth switching valve.

11. The apparatus according to claim 7, wherein a gas conduit interconnecting the discharge side of said multistage compressor and said gas nozzle is branched halfway along a length thereof and connected to the suction side of said multistage compressor and a switchover valve for connecting said gas nozzle to either of the discharge side or the suction side of said multistage compressor is provided at the point of said branching in the place of said first switching valve and said second switching valve.

12. The apparatus according to claim 8, wherein a gas conduit having a pressure adjusting valve and a first auxiliary switching valve inserted therein interconnects a line between said pressure accumulating container and said first switching valve and a line between said gas nozzle and said first switching valve.

13. The apparatus according to claim 7, wherein a gas conduit having a pressure adjusting valve and a second auxiliary switching valve inserted therein interconnects a line between said gas nozzle and said second switching valve and a line between said second switching valve and said recover container.

* * * * *